United States Patent [19]
Riordan

[11] 3,768,874
[45] Oct. 30, 1973

[54] FOUR WHEEL SKID CONTROL SYSTEM
[75] Inventor: Hugh E. Riordan, Ann Arbor, Mich.
[73] Assignee: Kelsey-Hayes Company, Romulus, Mich.
[22] Filed: Apr. 5, 1972
[21] Appl. No.: 182,188

Related U.S. Application Data
[63] Continuation of Ser. No. 859,773, Sept. 22, 1969, abandoned.

[52] U.S. Cl.............................. 303/21 BE, 303/20
[51] Int. Cl.............................................. B60t 8/08
[58] Field of Search...................... 188/181; 303/20, 303/21; 317/5; 324/160–162; 340/52 R, 52 B, 262, 263

[56] References Cited
UNITED STATES PATENTS
3,482,887  12/1969  Sheppard....................... 303/21 BE
3,650,573  3/1972  Inada et al........................ 303/21 F

*Primary Examiner*—Milton Buchler
*Assistant Examiner*—Stephen G. Kunin
*Attorney*—William L. Anthony et al.

[57] ABSTRACT

A four wheel skid control system in which the operation of a first wheel through skid control apparatus controls the basic brake pressure and a second wheel, during skid control, utilizes the controlled basic brake pressure to maintain maximum retarding force while a third wheel utilizes the controlled basic brake pressure and follows the speed of the first wheel and a fourth wheel utilizes the controlled basic brake pressure and follows the speed of the second wheel.

20 Claims, 1 Drawing Figure

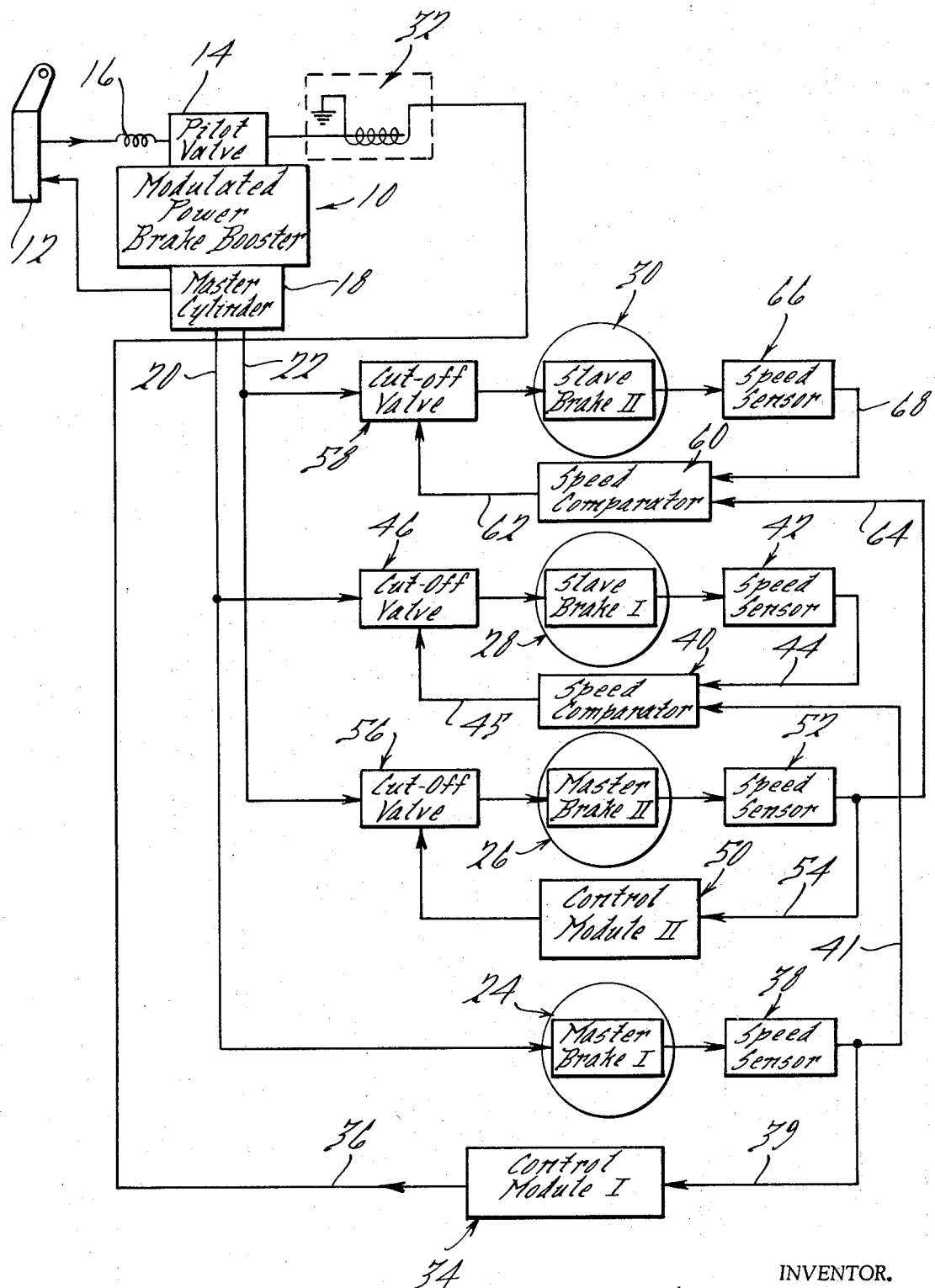

FOUR WHEEL SKID CONTROL SYSTEM

This is a continuation of application Ser. No. 859,773, filed Sept. 22, 1969, now abandoned.

SUMMARY BACKGROUND OF THE INVENTION

The present invention relates to skid control systems and more particularly to a skid control system for a four wheeled vehicle. For four wheeled vehicles it could be desireable to provide skid control for each wheel. This, however, ultimately could require a sophisticated computer and a modulating valve to control fluid pressure for each wheel. It is possible to control the wheels in pairs but this would still require two such computers and valves. In the present invention only one control valve is required, the wheels are generally controlled in pairs with skid control being accomplished overall while maintaining good directional stability.

Therefore, it is an object of the present invention to provide a novel skid control system.

It is another object to provide a skid control system for a four wheeled vehicle utilizing only a single modulating valve.

Other objects, features, and advantages of the present invention will become apparent from the subsequent description and the appended claims taken in conjunction with the accompanying drawings.

The sole FIGURE is a schematic, block diagram of a system exemplifying features of the present invention.

Looking now to the drawing, a power booster 10 is shown to be actuated by a brake pedal 12 which is supported for pivotal movement to actuate a pilot valve 14 through a spring member 16. The booster 10 operates upon a dual master cylinder 18 and provides pressurized output for one pair of brakes at line 20 and for the other pair of brakes at line 22.

The system is for a vehicle having four wheels which have been generally indicated by the numerals 24, 26, 28 and 30. The wheel 24 includes a master brake system I which is connected with a slave brake system I for wheel 28. The wheel 26 includes a master brake system II which is connected with a slave brake system II for wheel 30. The master and slave brake systems I for wheels 24 and 28 are actuated by master cylinder pressure via line 20 while the master and slave brake systems II for wheels 26 and 30 are actuated by master cylinder pressure via line 22.

The pilot valve 14, booster 10 and master cylinder 18 can be constructed in accordance with known brake booster technology and hence the details have been omitted for simplicity.

The pilot valve 14 controls the booster 10 to in turn control the pressure applied to fluid lines 20 and 22 by the master cylinder 18. The pilot valve 14 is normally controlled by the vehicle operator via pedal 12 and spring 16; in addition the pilot valve 14 can be controlled by a control overriding the manual or pedal 12 control by means of modulating control 32. The modulating control 32 when actuated, in a manner to be described, will operate on the pilot valve 14 whereby the booster 10 will be relieved to in turn cause pressure relief at lines 20 and 22 from master cylinder 18.

The modulating control 32 is actuated by a skid control module 34 via a conductor 36. The control module 34 receives a speed signal from a wheel speed sensor 38, via conductor 39, which speed signal has a magnitude indicative of the speed of wheel 24. It is known that if the deceleration rate of a wheel becomes excessive that the wheel is in an incipient skid condition and that to prevent wheel lock up the brake pressure should be relieved. Thus the control module 34, by appropriate differentiation, can determine the magnitude of deceleration of wheel 24. When this exceeds a preselected magnitude indicative of an incipient skid condition the module 34 will transmitt a control signal, via conductor 36, to modulator 32. The modulator 32 can be a force motor or solenoid which when energized acts upon the pilot valve 14 such as to relieve the booster 10. With the booster 10 relieved the pressure from master cylinder 18 will also be relieved.

Note that the pressure relief as caused by module 34 will result in relief of basic pressure to all of the brake systems; this will occur in response only to the condition of the wheel 24. To provide directional stability it is desireable that the different vehicle wheels rotate at the same speed or at least pairs of wheels rotate at the same speed while at the same time being skid controlled to prevent lock up. In the system shown in the drawing, the wheel speeds of wheels 24 and 28 are held close to each other during a skid control. Thus the wheel speed signal from sensor 38 is transmitted, via conductor 41, to a speed comparator section 40 associated with the slave wheel brake I for wheel 28. The wheel speed for wheel 28 is sensed via sensor 42 and that signal is transmitted to comparator 40 via conductor 44. The comparator 40 will compare the magnitudes of wheel speeds for wheels 24 and 28 and when the speed of wheel 28 is greater than the speed of wheel 24 then comparator 40 will provide an output signal, via conductor 45, to a cut-off valve 46 which will be actuated such that the slave brake system I for wheel 28 will be blocked from master cylinder line 20. Note that this occurs while the fluid pressure is decreasing in magnitude as a result of pressure relief during skid control. Thus, since the pressure will continue to fall at master brake system I while it is being held at slave brake system II the wheel 28 will move towards the speed of wheel 24. When this speed is attained the comparator 40 will no longer actuate cut-off valve 46 and it will no longer block the slave brake system I from the master cylinder pressure. In this way the wheels 24 and 28 will tend to follow each other in speed. In practice the wheel 24 will be on one side of the vehicle and the wheel 28 on the other side; the wheels 24 and 28 can be both front wheels, both rear wheels, or one front and one rear, but with one on each side and with their speeds being maintained proximate each other directional stability and skid control can be attained. The other two wheels, 26 and 30, are controlled together in a similar manner and are also similarly located on opposite sides of the vehicle.

A second module, 50, control module II, controls the master brake system II for wheel 26. Thus the module 50 receives from sensor 52, via conductor 54, the signal indicative of the magnitude of the speed of wheel 26. The module 50 is similar to module 34 and senses when the deceleration rate of wheel 26, via the signal from sensor 52, exceeds a preselected magnitude in which event module 50 provides a control signal. The preselected magnitude is selected such as to provide for optimum deceleration whereby retarding force is optimized. The control signal from module 50 is transmitted to a cut-off valve 56 which when actuated blocks master cylinder pressure from master brake system II for wheel 26. Thus wheel 26 will be held at the optimum deceleration rate as pressure falls in line 22. To provide directional stability, the wheel 30 is slaved with the wheel 26 in the same manner as wheel 28 is slaved with wheel 24. Thus wheel 30 has its slave brake system II controlled by cut-off valve 58 (similar to valves 46 and 56) which in turn is controlled by speed comparator 60 (via conductor 62), which operates in a manner similar to comparator 40, thus when the wheel speed signal (wheel 26) from sensor 52 via conductor 64 exceeds the wheel speed signal (wheel 30) from sensor 66, via conductor 68, comparator 60 will provide a signal to valve 58 to block pressure from line 22; this will tend to hold the speed of wheels 26 and 30 close together whereby directional stability is enhanced.

Thus with the system as shown, four wheels can be skid controlled utilizing only one main modulating device and the wheels are paired such that one wheel at one side of the vehicle is slaved to a wheel at the opposite side whereby directional stability is enhanced.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. In a skid control system for controlling the fluid pressure provided to the brakes of at least two wheels of a wheeled vehicle, said system comprising: first speed sensing means for sensing the wheel speed of the first of said wheels and for providing a first wheel speed signal representative of the wheel speed of the first of said wheels, second speed sensing means for sensing the wheel speed of the second of said wheels and for providing a second wheel speed signal representative of the wheel speed of the second of said wheels, detection means for detecting the occurrence of an incipient skid condition at the first of said wheels and for providing a control signal in response thereto, first control means for modulating the pressure provided to the brakes of the first of said wheels in response to said control signal, and second control means receiving said first and second wheel speed signals connected with the brakes of the second of said wheels for modulating the pressure provided to the brakes of the second of said wheels without modulating the pressure provided to the brakes of the first of said wheels to control the speed of the second of said wheels in accordance with the first speed signal during said modulating of the pressure to the brakes of the first of said wheels in response to the detected occurrence of an incipient skid condition.

2. The system of claim 1, with said first and second wheel brakes being operative from a common fluid system.

3. The system of claim 2 with said second control means comprising a cut-off valve for blocking the brakes of the second of said wheels from the common fluid system when the speed of the first and second wheel speed signals reach a preselected relationship.

4. The system of claim 3 with said common system including a common power booster and with said preselected relationship being when the second wheel speed signal of the second of said wheels falls below the first wheel speed signal.

5. The system of claim 4 further comprising third and fourth of said wheels having brakes all operative from the common system and further comprising third speed sensing means for sensing the wheel speed of the third of said wheels and for providing a third wheel speed signal representative of the wheel speed of the third of said wheels, fourth speed sensing means for sensing the wheel speed of the fourth of said wheels and for providing a fourth wheel speed signal representative of the wheel speed of the fourth of said wheels, third control means for controlling the speed of the fourth of said wheels in accordance with the speed of the third of said wheels.

6. The system of claim 5 comprising fourth control means operative on the pressure as determined by said first control means and with the third of said wheels for maintaining the deceleration of the third of said wheels at a magnitude to optimize retarding force.

7. The system of claim 6 with said third and fourth control means each including a cut-off valve operative for blocking fluid pressure from the common fluid system to the brakes of third and fourth of said wheels, respectively.

8. The system of claim 7 with said third control means operative with its said cut-off valve to maintain the speed of the fourth of said wheels proximate that of the third of said wheels.

9. The system of claim 8 with said second control means including first comparator means to provide a signal to actuate the associated said cut-off valve when the speed of the second of said wheels falls below the first and with said third control means including second comparator means to provide a signal to actuate the associated said cut-off valve when the speed of the fourth of said wheels exceeds the speed of the third of said wheels.

10. The system of claim 2 further comprising third and fourth wheels having brakes all operative from the common system and further comprising third speed sensing means for sensing the wheel speed of the third wheel and for providing a third wheel speed signal representative of the third of said wheels, fourth speed sensing means for sensing the wheel speed of the fourth of said wheels and for providing a fourth wheel speed signal representative of the fourth of said wheels, third control means for controlling the speed of the fourth of said wheels in direct accordance with the speed of the third of said wheels.

11. The system of claim 10 comprising fourth control means operative on the pressure as determined by said first control means and responsive to the third wheel speed signal for maintaining the deceleration of the third of said wheels at a magnitude to optimize retarding force.

12. The system of claim 11 with said third and fourth control means each including a cut-off valve operative for blocking fluid pressure from the common fluid system to the brakes of the third and fourth of said wheels, respectively.

13. In a skid control system for controlling the fluid pressure to the brakes of at least two wheels of a wheeled vehicle which are operative from a common fluid system including a common power booster, said system comprising: first detection means for detecting the occurrence of an incipient skid condition at the first of said wheels and for providing a first control signal in response thereto, first control means for modulating the pressure to the brakes of the first and second of said wheels from said common fluid system in response to said first control signal, and second control means connected with the second of said wheels comprising a cut-off valve for blocking the brakes of the second of said wheels from the common fluid system where the speed of the second of said wheels attains a preselected relationship with the speed of the first of said wheels during said modulating of the pressure to the brakes of the first of said wheels in response to the detected occurrence of an incipient skid condition, said second control means including first comparator means to provide a signal to actuate said cut-off valve when the speed of the second of said wheels attains said preselected relationship with the speed of the first of said wheels.

14. The system of claim 13 further including: third and fourth wheels all operative from the common system, second detection means for detecting the occurrence of an incipient skid condition at the third of said wheels and for providing a second control signal in response thereto, third control means for affecting the pressure to the brakes of the third of said wheels from said common fluid system in response to said second control signal, and fourth control means for controlling the speed of the fourth of said wheels in accordance with the speed of the third of said wheels, said fourth control means including a cut-off valve operative for blocking fluid pressure from the common fluid system.

15. The system of claim 14 wherein said fourth means is operative with its cut-off valve to maintain the speed of the fourth of said wheels in a predetermined relationship with the speed of the third of said wheels.

16. The system of claim 15 wherein said fourth control means includes second comparator means to provide a signal to actuate the associated cut-off valves when the speed of the fourth of said wheels attains said predetermined relationship with the speed of the third of said wheels.

17. In a skid control system for controlling the fluid pressure provided to the brakes of at least two wheels of a wheeled vehicle, said system comprising: first speed sensing means for sensing the wheel speed of the first of said wheels and for providing a first wheel speed signal representative of the wheel speed of the first of said wheels, second speed sensing means for sensing the wheel speed of the second of said wheels and for providing a second wheel speed signal representative of the wheel speed of the second of said wheels, first control means including detection means for detecting the occurrence of an incipient skid condition at the first of said wheels for providing a first control signal in response thereto, said first control means including means for controlling the pressure provided to the brakes of the first of said wheels in response to said first control signal, and second control means receiving said first and second wheel speed signals for comparing said first and second wheel speed signals and for providing a second control signal in accordance with a relationship between said first and second wheel speed signals, said second control means including means receiving said second control signal for controlling the pressure provided to the brakes of the second of said wheels, said second control means being adapted for controlling the pressure provided to the brakes of the second of said wheels without delay so that said second control means can control the pressure provided to the brakes of the second of said wheels during the initial period of said modulation of the pressure to the brakes of the first of said wheels in response to the detected occurrence of an incipient skid condition.

18. In a skid control system for controlling the fluid pressure to the brakes of at least two wheels of a wheeled vehicle which are operative from a common fluid system including a common power booster said system comprising: detection means for detecting the occurrence of an incipient skid condition at the first of said wheels and for providing a control signal in response thereto, first control means for modulating the pressure to the brakes of the first of said wheels in response to said control signal, second control means connected with the second of said wheels comprising a cut-off valve for blocking the brakes of the second of said wheels from the common fluid system when the speed of the second of said wheels exceeds that of the first, during said modulating of the pressure to the brakes of the first of said wheels in response to the detected occurrence of an incipient skid condition, third and fourth of said wheels all operative from the common system, said second control means including first comparator means to provide a signal to actuate the associated said cut-off valve when the speed of the second of said wheels exceeds the first, third control means for controlling the speed of the fourth of said wheels in accordance with the speed of the third of said wheels, and fourth control means operative on the pressure as directed by said first control means and with the third of said wheels for maintaining the deceleration of the third of said wheels at a magnitude to optimize retarding force, said third and fourth control means each including a cut-off valve operative for blocking fluid pressure from the common fluid system, said third means operative with its said cut-off valve to maintain the speed of the fourth of said wheels proximate that of the third of said wheels, said third control means including second comparator means to provide a signal to actuate the associated said cut-off valve when the speed of the fourth of said wheels exceeds the speed of the third of said wheels.

19. In a skid control system for controlling the fluid pressure provided to the brakes of at least two wheels of a wheeled vehicle, said system comprising: first speed sensing means for sensing the wheel speed of the first of said wheels and for providing a first wheel speed signal representative of the wheel speed of the first of said wheels, second speed sensing means for sensing the wheel speed of the second of said wheels and for providing a second wheel speed signal representative of the wheel speed of the second of said wheels, first control means including detection means for detecting the occurrence of an incipient skid condition at the first of said wheels for providing a first control signal in response thereto, first modulating means for modulating the pressure provided to the brakes of the first of said wheels in response to said first control signal, second control means receiving said first and second wheel speed signals for comparing said first and second wheel speed signals and for providing a second control signal in accordance with a difference in said first or second wheel speed signals, and second modulating means receiving said second control signal for modulating the pressure provided to the brakes of the second of said wheels, said skid control means being adapted for controlling the modulation of the pressure provided to the brakes of the second of said wheels without controlling the modulation of the pressure provided to the brakes of the first of said wheels during said modulation of the pressure to the brakes of the first of said wheels in response to the detected occurrence of an incipient skid condition.

20. In a skid control system for controlling the fluid pressure to the brakes of at least two wheels of a wheeled vehicle which are operative from a common fluid system including a common power booster, said system comprising: first detection means for detecting the occurrence of an incipient skid condition at the first of said wheels and for providing a first control signal in response thereto, first control means for modulating the pressure to the brakes of the first and second of said wheels from said common fluid system in response to said first control signal, and second control means connected with the second of said wheels comprising a cut-off valve for blocking the brakes of the second of said wheels from the common fluid system when the speed of said wheels indicates the occurrence of an incipient skid condition at the second of said wheels.

* * * * *